United States Patent [19]

Romano

[11] Patent Number: 5,622,630
[45] Date of Patent: Apr. 22, 1997

[54] APPARATUS FOR AND METHOD OF TREATMENT OF MEDIA CONTAINING UNWANTED SUBSTANCES

[75] Inventor: Dominic A. Romano, Pomona, Calif.

[73] Assignees: Alvin B. Green, Northridge; Jules Berman, Beverly Hills, both of Calif.; part interest to each

[21] Appl. No.: 646,961

[22] Filed: May 8, 1996

Related U.S. Application Data

[63] Continuation of Ser. No. 230,142, Apr. 13, 1994, abandoned.

[51] Int. Cl.$^6$ ......................................... C02F 1/42
[52] U.S. Cl. ..................... 210/683; 210/687; 210/691; 210/692; 210/693; 210/799; 134/10
[58] Field of Search ................................. 210/683, 685, 210/687, 690, 691, 692, 693, 694, 799, 242.4, 924, 925; 134/10; 8/137; 252/175; 95/135, 136, 141, 143

[56] References Cited

U.S. PATENT DOCUMENTS

| | | | |
|---|---|---|---|
| 1,745,844 | 2/1930 | Cowles | 252/89 |
| 2,004,257 | 6/1935 | Tschirner | 210/687 |
| 2,213,641 | 9/1940 | Tainton | 252/89 |
| 3,009,872 | 11/1961 | Snell et al. | 210/687 |
| 3,023,132 | 2/1962 | Diamond et al. | 210/687 |
| 3,037,338 | 6/1962 | Thomas | 55/58 |
| 3,037,886 | 6/1962 | Ryznar | 134/10 |
| 3,676,357 | 7/1972 | Ciuti et al. | 20/691 |
| 3,694,364 | 9/1972 | Edwards | 252/90 |
| 3,699,039 | 10/1972 | Calmon | 210/28 |
| 3,732,326 | 5/1973 | Chen | 210/691 |
| 4,026,792 | 5/1977 | Orth, Jr. | 210/73 |
| 4,066,394 | 1/1978 | Leonard | 8/137 |
| 4,121,903 | 10/1978 | Smolka | 8/137 |
| 4,162,236 | 7/1979 | Feierstein | 252/558 |
| 4,167,481 | 9/1979 | Cremers et al. | 210/36 |
| 4,168,250 | 9/1979 | Sutthoff et al. | 260/17.4 |
| 4,182,690 | 1/1980 | Suzuki et al. | 252/358 |
| 4,190,551 | 2/1980 | Murata et al. | 252/99 |
| 4,206,080 | 6/1980 | Sato et al. | 252/430 |
| 4,219,535 | 8/1980 | Sugahara et al. | 423/328 |
| 4,221,565 | 9/1980 | Graupner et al. | 8/137 |
| 4,238,346 | 12/1980 | Sugahara et al. | 252/174.25 |
| 4,309,281 | 1/1982 | Dessau | 208/310 |
| 4,363,672 | 12/1982 | Kulprathipanja | 127/46.3 |
| 4,421,567 | 12/1983 | Kulprathipanja et al. | 127/46.3 |

(List continued on next page.)

OTHER PUBLICATIONS

JWPCF, 1978, vol. 50, No. 3, pp. 433–441, Hopping, William D., "Activated Sludge Treatability of Type A Zeolite".

Environ. Int., 1980, vol. 3, No. 1, pp. 49–58, Stoveland, S.; Lester, J.N.; Perry, R., "The Influence of Zeolite Type A on Heavy Metal Transfer in the Activated Sludge Process".

(List continued on next page.)

*Primary Examiner*—Cynthia L. Nessler
*Attorney, Agent, or Firm*—Joseph C. Schwalbach

[57] ABSTRACT

An apparatus and method for removing unwanted substances from media such as water and soil. Various industrial waste water streams can be treated simply and effectively to remove therefrom such unwanted substances as petroleum hydrocarbons, heavy metals, phenolics, salt, ethylene glycol, and strontium, and sea water can be similarly treated to remove salt as well as petroleum hydrocarbons therefrom. Waste water or sea water is contacted with zeolite in the presence of a surfactant, and optionally hydrophobic cellulose, to effect removal of the unwanted substances therefrom; and soil contaminated with petroleum hydrocarbons, salt or agricultural chemicals can be rejuvenated by mixing the soil with zeolite and a surfactant followed by washing. The apparatus and method provides simultaneous removal of a wide variety of unwanted substances from a feed stream passed therethrough, in contrast to prior art procedures effective to remove only one such substance per treatment. The method is further effective to suppress the formation of foul smelling gas in standing water containing petroleum hydrocarbons and one or more substances tending to promote such gas formation.

19 Claims, 3 Drawing Sheets

U.S. PATENT DOCUMENTS

| | | | |
|---|---|---|---|
| 4,519,918 | 5/1985 | Ericsson et al. | 210/680 |
| 4,537,877 | 8/1985 | Ericsson | 502/402 |
| 4,561,976 | 12/1985 | Houser | 210/290 |
| 4,569,756 | 2/1986 | Klein | 210/193 |
| 4,664,839 | 5/1987 | Rieck | 252/175 |
| 4,773,939 | 9/1988 | Meffert et al. | 134/10 |
| 4,988,440 | 1/1991 | Bernard et al. | 210/504 |
| 5,085,784 | 2/1992 | Ostreicher | 210/767 |
| 5,108,617 | 4/1992 | Eriksson et al. | 210/679 |
| 5,236,595 | 8/1993 | Wang et al. | 210/669 |
| 5,238,575 | 8/1993 | Waldmann | 210/680 |
| 5,242,503 | 9/1993 | Grant et al. | 210/688 |

OTHER PUBLICATIONS

JWPCF, Nov. 1980, vol. 5, No. 11, pp. 2796 to 2806, Corrando, Manuel J.T.; Perry, Rodger; Lester, John N., "Type A Zeolite in the Activated Sludge Processes—I: Treatment Parameters".

JWPCF, 1980, vol. 52, No. 12, pp. 2875–2886, King, James E., Hopping, William D. and Holman, William F., "Treatability of Type A Zeolite in Waste Water—Part I".

JWPCF, 1980, vol. 52, No. 12, pp. 2887–2905, Holman, William F, Hopping, William D., "Treatability of Type A Zeolite in Wastewater—Part II".

Water Res., 1981, vol. 15, No. 7, pp. 889–901, Baumann, E. Robert; Hopping, William D.; and Warner, Fred D., "Field Evaluation of the Treatability of Type A Zeolite in a Trickling Filter Plant".

JWPCF, 1981, vol. 53, No. 3, pp. 344–351, Carrondo, Manuel T.J.; Lester, John N.; Perry, Roger, "Type A zeolite in the activated sludge process—II: heavy metal removal".

NTIS Accession No. DE93009720/XAB, Report No.: CONF–930304–12, ACS National Meeting at Denver, Co. Abstract only.

*Hawley's Condensed Chemical Dictionary*, Van Nostrand Reinhold, (1993) pp. 486, 487, 1108, 1109.

APPARATUS FOR AND METHOD OF TREATMENT OF MEDIA CONTAINING UNWANTED SUBSTANCES

This application is a continuation of application Ser. No. 08/230,142, filed Apr. 13, 1994, now abandoned.

This invention, in general, relates to protection of the environment, and more particularly to an apparatus and method for treatment of media, such as waste or sea water or contaminated soil, to remove therefrom one or more unwanted substances contained therein.

BACKGROUND OF THE INVENTION

One of the most serious problems facing the world today is the availability of clean fresh water for the well being and survival of mankind. Disposal into sewers and storm drains, or into the soil, of petroleum-based waste products, as well as waste water containing those and a variety of other contaminants, has become a major source of ground water contamination. Wells which supplied drinking water for thousands of people have become contaminated and unusable. This has given rise to numerous community, state and federal regulations setting standards for the protection of the environment, including standards for contaminant content of waste disposed of in local sewers, water courses and elsewhere.

In their zeal for environmental protection, some communities have set standards requiring the contaminant content of such waste waters to be so low that they could not be met by the use of presently available technology. As a result, some of these community standards have been reluctantly amended to permit higher levels of contaminant content which can be met with available technology.

There are many contaminants from numerous sources which are capable of polluting ground water and thereby threatening the environment, as well as the health of the populace. Some of such contaminants and sources thereof include lubricating oil, diesel fuel and grease from the auto and truck servicing industry; surfactant or soap laden waste water from laundry and dishwashing equipment; and ethylene glycol from the auto, truck and aircraft servicing industries, as well as from other industries where ethylene glycol is used in day to day operations.

Other sources of environmental pollution include agricultural run-off containing insecticides or other agricultural chemicals washed by rain or irrigation sprays from crops on which they were sprayed. Waste water from the photographic processing industry is a source of polluting metal salts, as is the electronic component manufacturing industry. An additional source of pollution is that resulting from backwashing of swimming pool filters in which the filtering medium is diatomaceous earth. Community standards in some areas of the country are presently so restrictive that the effluent from such back washing cannot be discharged into local sewers.

Because of the unavailability of any quick and efficient means for separating petroleum hydrocarbons, such as lubricating oil, grease and diesel fuel, as well as other contaminants from waste water containing the same, resort has been had by the automobile and truck service industry to the use of clarifiers. These commonly comprise a series of four open settling tanks, each of about 400 gallon capacity, disposed at different levels. Contaminated waste water is fed into the highest tank, and the overflow therefrom is fed into the second highest tank. With the exception of the lowest tank, the overflow from each tank is fed into the next lower tank in the series.

Much of the heavy oil, grease and solids in the waste water fed to the clarifier collect in the first and second tanks, and is periodically removed therefrom in the form of a sludge which is hauled away by licensed disposal services. For a period of time, the effluent from the lowermost tank is of a quality which meets local environmental standards. Eventually, however, the third tank in the series collects a significant amount of sludge and must be cleaned out along with the first two tanks, in order for the clarifier to continue to produce acceptable quality effluent.

Unfortunately a clarifier as just described produces additional environmental pollution, namely air pollution. More particularly, the waste water in the clarifier tanks tends, over time, to promote the generation of a foul smelling gas having an odor similar to that of sewer gas, which odor permeates the surrounding neighborhood.

SUMMARY OF THE INVENTION

In contrast to the aforementioned slow, malodorous and inefficient settling tank procedure, the present invention provides a means for removing or rendering innocuous a wide variety of contaminants from media, such as waste water or soil containing the same, doing so quickly, easily and inexpensively. The forms of the invention disclosed and claimed herein are capable of removing from waste water, unwanted contaminating petroleum based products, such as gasoline, grease, lubricating oil, diesel fuel, brake fluid and transmission fluid, as well as numerous other substances, such as ethylene glycol, heavy metals and hazardous organic solvents.

By the present invention, waste water can be treated so that it is not only of a quality which meets or exceeds the most rigid community, state and federal standards for disposition into local sewer systems, but it can also be treated so that it is fit for human consumption.

Surprisingly, the invention can have great application in arid countries which presently rely on expensive desalinization operations for their water supply. To this end, the invention is effective to quickly and inexpensively remove unwanted salt from sea water, as well as from brine or salt impregnated soil. In addition, the invention is effective to remove unwanted polluting metal salts from waste water of the photographic processing and other industries, such as the electronic component manufacturing industry, whose waste water includes polluting metal salts.

The apparatus of the present invention can be effectively used in place of diatomaceous earth type swimming pool filters to maintain the quality of the swimming pool water in a manner which is in compliance with all presently known environmental standards. Moreover, the method of the invention can also be used effectively to prevent the formation of foul smelling gas in clarifier settling tanks containing waste water of the type mentioned earlier herein.

The illustrated embodiments of the invention comprise one or more modular system components or tanks through which waste water, fresh water or sea water, as the case may be, is passed, usually after dilution with fresh water. In each of these tanks the influent water contacts a quantity of zeolite in the presence of a surfactant. The tanks may advantageously also contain a quantity of cellulose, which is preferably hydrophobic, and with which the water passing therethrough also comes in contact.

If the influent waste or sea water is known to contain a surfactant, the amount thereof may be sufficient for effective operation of the invention, without the need for additional surfactant.

Waste water from automobile and truck washing operations usually contains significant quantities of surfactant and is typical of the type of waste water which is advantageously diluted with fresh water in order for the invention to work most efficiently thereon. Contaminants in such waste water can include such unwanted substances as oil and grease, lubricating oil, brake, transmission and power steering fluid, engine coolant and battery acid or the like which are washed-off of automobiles and trucks.

In the situation in which the waste water is known to not contain any significant amount of surfactant, an effective amount thereof is added to the waste water and/or the treatment tank. This situation is likely to occur when the waste water to be treated comes from an automobile or truck repair center, as distinguished from an automobile or truck washing establishment.

Another situation which would require the addition of surfactant would be where the water to be treated is sea water contaminated with oil from an oil spill. In such a case, the invention is effective to remove both the oil and the salt from sea water.

While the invention may find its greatest application in the removal of substances from waste water, sea water and the like using the apparatus described, another application which may have great environmental implications, and which does not involve the use of such apparatus, involves the decontamination of soil which has become impregnated with petroleum hydrocarbons or has been rendered agriculturally useless because of impregnation with salt. To decontaminate such soil, zeolite in powder form and surfactant in powder form are mixed with the soil along with water. After the mixing is complete, the soil is then washed with fresh water to remove the innocuous by-products of the process and thereby return the soil to its original useful state.

BRIEF DESCRIPTION OF DRAWINGS

The invention can best be understood by reference to the drawings accompanying and forming a part of this application, wherein.

DESCRIPTION OF THE PREFERRED EMBODIMENT

Figure 1:
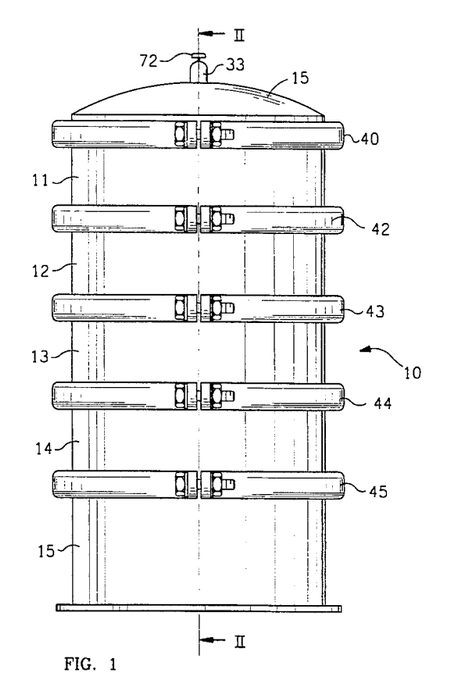
FIG. 1 is a side elevational view of a modular system component of the presently preferred form of the invention, which component is in the form of a compartmented tank.
Figure 2:
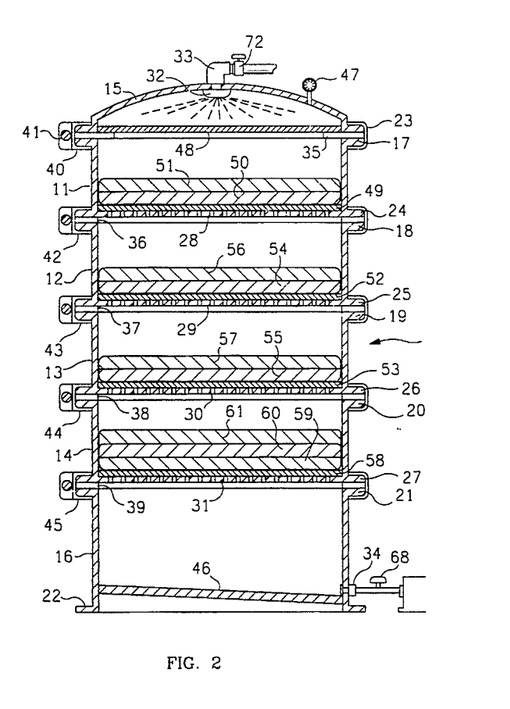
FIG. 2 is a vertical sectional view taken along the line II—II of FIG. 1.
Figure 3:
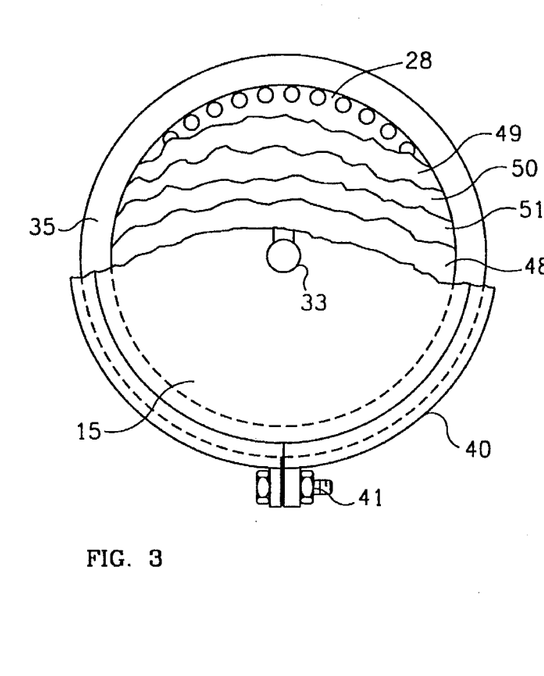
FIG. 3 is a plan view of the modular system component shown in FIG. 1, parts being broken away.

Referring now to FIGS. 1 to 3 of the drawings, the modular system component illustrated therein comprises a tank formed of four stacked coaxial cylindrical compartment members 11, 12, 13 and 14, a cover member 15, and a cylindrical base member 16.

As best shown in FIG. 2, the compartment members 11 to 14 are formed at their upper ends, respectively, with radially outwardly projecting annular flanges 17, 18, 19 and 20. The base member 16 is formed at its upper and lower ends, respectively, with radially outwardly projecting annular flanges 21 and 22. The cover 15 is similarly formed with a radially outwardly projecting annular flange 23. The compartment members 11 to 14 are formed at their lower ends, respectively, with radially outwardly projecting annular flanges 24, 25, 26 and 27. The compartment members 11 to 14 are also formed at their lower ends with perforated horizontal bottom walls 28, 29, 30 and 31, respectively. The perforations in the bottom walls 28 to 31 may be in the form of closely spaced apertures of about ¼ inch across.

Figure 4:
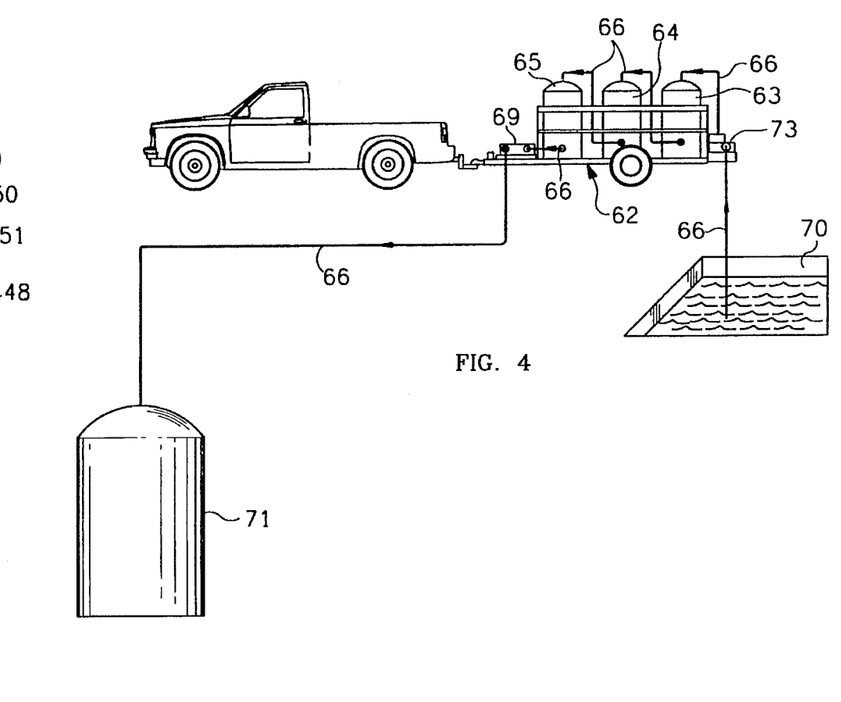
FIG. 4 diagrammatically illustrates a mobile waste water treatment system including three modular system components of the type shown in FIGS. 1 to 3 connected in series.

The cover 15 is provided on the interior thereof with a spray head 32 which has an external connection fitting 33, which may incorporate a shut off valve 72, and has means (not shown) for providing a readily releasable connection to piping system 66 to be described hereinafter, which system may be connected to a source of waste water to be treated. Alternatively, the piping system aforementioned may provide a connection of fitting 33 to the outlet of another like modular system component and provide a series connection of multiple components as shown in FIG. 4.

The base member 16 is formed with an internal sloping drain pan 46, at the lower end of which the side wall of base member 16 is provided with a tubular drain fitting 34. The fitting 34 may be of any suitable type providing a readily releasable connection to the aforementioned piping system 66, to a drain line or to conduit means extending to the inlet connection 33 of a like modular system component with which it is serially connected.

Interposed between the coaxial annular flanges 23 and 17 of the cover 15 and compartment member 11, respectively, is a flat annular sealing gasket 35. The gasket 35 may have an inner diameter somewhat smaller than that of compartment member 11, for a purpose which will become apparent hereinafter. Interposed between the coaxial flanges 24 and 18 of the compartment members 11 and 12, respectively, is a flat annular sealing gasket 36. Interposed between the coaxial annular flanges 25 and 19 of compartment members 12 and 13, respectively, is a flat annular sealing gasket 37. Interposed between the coaxial annular flanges 26 and 20 of compartment members 13 and 14, respectively, is a flat annular sealing gasket 38. Interposed between the annular flanges 27 and 21 of the compartment member 14 and base member 16, respectively, is a flat annular sealing gasket 39.

The cover 15 is held in coaxial sealing relationship with the upper compartment member 11 and sealing gasket 35 by an annular tension band 40 having a channel shaped cross section. The tension band 40 engages the flanges 23 and 17 and biases the same toward each other into sealing engagement with the gasket 35 under the tensioning effect of an adjustable screw connection 41 shown in FIG. 3, in a manner well known in the art.

A similar tension band 42 holds the compartment members 11 and 12 in coaxial sealing relationship with gasket 36, and the same type of band 43 holds the compartment members 12 and 13 in coaxial sealing relationship with gasket 37. An annular tension band 44 similarly holds the compartment members 13 and 14 in coaxial sealing relationship with gasket 38, whereas a like annular tension band 45 holds the compartment member 14 in coaxial sealing relationship with gasket 39. The cover 15 may be provided with a pressure relief valve 47 as shown in FIG. 2.

The size of the modular system component 10 is not narrowly critical. However, it is preferably of a size which can be readily handled. The diameter of component 10 may be of the order of about 36 inches, and each of the cylindrical compartment members 11 to 14 may have an axial dimension of the order of about 8 inches. The base 16 may have an axial dimension of the order of about 24 inches.

Suitably mounted transversely within the cover 15 near the lower edge thereof is a circular prefilter 48 which may be formed of glass fiber and which is approximately ⅛ inch thick. In FIG. 2 the perimeter of the prefilter 48 rests on the inner margins of the gasket 35.

Overlaying the perforated bottom wall 28 of the topmost cylindrical compartment member 11 is a circular pad 49 which is preferably in the form of a multilayer laminate of nonwoven, preferably hydrophobic, cellulose fibers. Overlaying the pad 49 is a bed 50 of, preferably hydrophobic, cellulose pellets, said pellets being retained within a perforated enclosure (not shown) which may take the form of a plastic mesh bag. Overlaying the bed 50 is a bed 51 of zeolite pebbles which are also retained within a perforated enclosure (not shown) such as a plastic mesh bag. The beds 50 and 51 are of the order of about 2 inches thick, and each, as well as the pad 49, extends into snug contact with the inner surface of the sidewall of the compartment member 11 throughout the periphery thereof. It will be observed that there is a significant cylindrical header space above the zeolite bed 51 and below the prefilter 48, which space may be of the order of about 4 inches.

Overlaying the perforated bottom walls 29 and 30 of cylindrical compartment members 12 and 13, respectively, are cellulose pads 52 and 53 which may be the same as the pad 49 in compartment member 11. Overlaying the cellulose pads 52 and 53, respectively, are beds 54 and 55 of, preferably hydrophobic, cellulose pellets. The beds 54 and 55 are preferably the same as the bed 50 in compartment member 11. Overlaying the respective beds 54 and 55 are beds 56 and 57 of zeolite pebbles which are preferably the same as the bed 51 in compartment member 11.

Overlaying the perforated bottom wall 31 of the cylindrical compartment member 14 is a cellulose pad 58 which is preferably the same as the cellulose pads 49, 52 and 53. Overlaying the cellulose pad 58 is a bed 59 of activated charcoal beads which are retained within a perforated enclosure (not shown) which may take the form of a plastic mesh bag. A bed 60 of cellulose pellets which is preferably the same as the beds 50, 54 and 55, overlays the bed 59, and a bed 61 of zeolite pebbles which is preferably the same as the beds 51, 56 and 57, overlays the cellulose bed 60.

One reason hydrophobic cellulose is preferred for use in the beds 50, 54, 55 and 60 and pads 49, 52, 53 and 58 is the fact that it is not absorptive of water. Experience has shown that when hydrophilic cellulose is used in the apparatus of the present invention, such cellulose tends to disintegrate because of absorption of water. The fact that hydrophobic cellulose tends to adsorb petroleum hydrocarbons may also be an advantage inherent in the use thereof.

It will be observed that each of the compartment members 12 and 13 has a header space above the zeolite bed therein which approximates that in the compartment 11. Due to the addition of bed 59 to the compartment member 14 below the beds 60 and 61, the header space above the bed 61 therein is shown reduced by the amount of the thickness of the bed 59. However, the invention also contemplates the use of uniform header spaces, if such is required for maximum efficiency.

The size of the zeolite pebbles, cellulose pellets and activated charcoal is not narrowly critical. Zeolite pebbles of the order of ⅓ inch across, cellulose pellets of the order of ¼ inch across, and activated charcoal beads of the order of ⅛ inch across have been found to perform very well. The plastic mesh enclosures or bags (not shown) have a mesh size small enough to contain the pebbles, pellets or beads enclosed therein, yet large enough to permit free flow of liquid therethrough. A mesh size of 1/32 inch has been found to work very well for this purpose.

Figure 6:
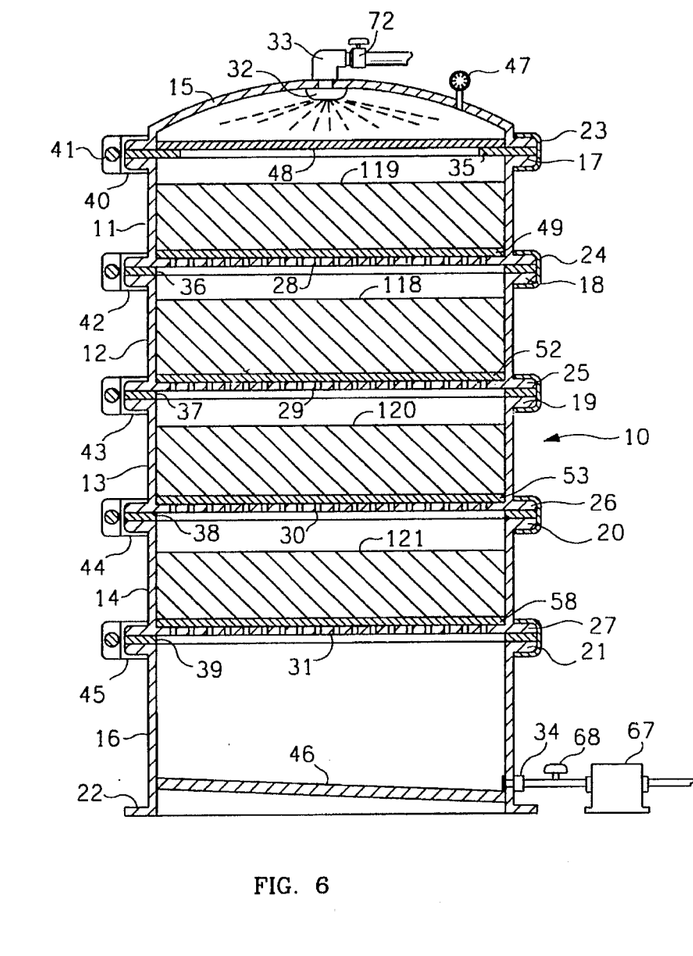
FIG. 6 is a vertical sectional view similar to FIG. 2 of a modified form of the invention.

FIG. 6 illustrates a modified form of the modular component shown in FIG. 2 in which the compartments 11, 12, 13 and 14 contain beds which are different in thickness, as well as different in arrangement, from that shown in FIG. 2. In FIG. 6 the parts common to FIG. 2 are indicated by the same reference characters as those used in FIG. 2.

In FIG. 6 the compartments 11, 13 and 14 have beds of zeolite pebbles 119, 120 and 121, respectively, therein, and compartment 12 has a bed 118 of preferably hydrophobic cellulose pellets disposed therein. The zeolite pebbles and cellulose pellets used in the respective beds are similar in size and content to those used in the form of the invention shown in FIG. 2, and the operation of the FIG. 6 embodiment is also similar to that of the embodiment of FIG. 2. In FIG. 6 the respective beds of zeolite and cellulose are disposed within open topped cylindrical, preferably metal, containers (not shown) said containers having perforated bottom walls (not shown) to permit fluid flow therethrough. Such containers, together with the respective beds therein, function as removable and replaceable cartridges. The beds 118 to 121 may have an axial dimension of the order of six inches, leaving a headspace thereabove of the order of two inches.

The zeolite used in the practice of the invention is preferably of the natural type. Synthetic zeolites can be used effectively, but are not preferred because of their cost and because they are not as long lasting as the natural zeolites. In contrast to the synthetic zeolites, natural zeolites appear to harden with use. Because of the great variation in the specific chemical content of zeolite found within a given source area, the chemical formula therefor must be considered to be approximate only. The zeolite presently preferred for use in the invention is readily available and falls within the class of clinoptilolite, which has the general formula $Na_4K_4[Al_8Si_{40}O_{96}] \cdot 24H_2O$. This zeolite is stated to have an $Al_2O_3/SiO_2$ ratio of about 7%12 percent and has dominant cations of sodium and potassium. This zeolite, which occurs naturally in the area of Tecopa, Calfi., has been found to work very well. It can be obtained from B.F.M. Specialty Minerals, 17092 D Street, Victorville, Calif. 92392.

A wide variety of other natural zeolites also works very well in the practice of the invention. Among such zeolites are members of the class of heulandite which fall within the general formula $(Na,Ca)_{4-6}Al_6(Al,Si)_4 Si_{26}O_{72} \cdot 24H_2O.$ In the mineralogical scientific literature it is stated that heulandite and clinoptilolite have the same aluminosilicate framework with only slight differences in those with high-silica or divalent cations. A continuous series between the calcium dominated low silica heulandite and potassium-sodium high-silica clinoptilolite has been well established, and it appears to be unsettled as to whether or not clinoptilolite should be characterized as a heulandite for this reason. The International Mineralogical Association recognizes both heulandite and clinoptilolite as separate species.

The dominant cations of sodium and potassium in the high-silica clinoptilolite make it particularly desirable for use in the present invention.

The following tabulation sets forth semi-quantitative analyses of three samples of heulandite type zeolite which work satisfactorily in this invention. All of these zeolites were from the same area and they illustrate the variation in content thereof which is typical in natural zeolites. The tabulation includes only those elements which are present in amounts of about one percent or more.

| Heulandite Zeolite Analyses | | | |
|---|---|---|---|
| | Sample No. 1 Percent | Sample No. 2 Percent | Sample No. 3 Percent |
| Silicon | 26.0 | 26.0 | 29.0 |
| Potassium | 4.5 | 3.8 | 4.0 |
| Aluminum | 7.3 | 11. | 9.0 |
| Iron | 2.0 | 1.8 | 2.6 |
| Calcium | 9.9 | 3.0 | 1.3 |
| Sodium | 3.8 | 5.8 | 3.7 |
| Magnesium | 1.3 | 0.99 | 1.2 |

The heulandite type natural zeolites of which the above tabulation is exemplary are found in the area of Ash Meadows, Calif. and can be obtained from American Borate Company, 55515 Dunn Road, Newberry Springs, Calif. 92365.

Other zeolites which are useful in the invention are found in the classes of chabazite and phillipsite. Chabazite has the formula $(Ca, Na_2, K_2, Sr, Mg) [Al_2Si_4O_{12}].6H_2O$ and has a wide variation in the exchangeable cations calcium, sodium, potassium, strontium and magnesium. There is a complete series between calcium-rich and sodium-rich chabazites without any correlation to crystal morphology. Because of the dominant cations of sodium therein, the sodium-rich chabozites are the preferred chabozites.

Some zeolites of the phillipsite class are also useful in the invention and have the general formula $(K_2, Ca, Na_2, Ba)_{2.5} (Al_5Si_{11}O_{32}). 13H_{32}O$. Phillipsite, wellsite, and harmotone have the same framework structure and represent a continuous chemical series in exchangeable cations from calcium to barium. Considerable potassium and sodium are commonly present. Phillipsite is defined as the member of the phillipsite structural group with less than 50 percent of the exchangeable cations being barium. Crystals with considerable sodium and potassium, but with less than 50 percent barium are potassium-sodium-barium phillipsite useful in the invention.

Another zeolite useful in the invention is analcime, which has the formula $(Na_2, Ca, Cs_2, Mg)_2 [Al_2Si_4O_{12}]. 2H_2O$. Analcime has a wide variation in calcium, sodium, cesium and magnesium and is classed in several crystal systems. One form of analcime has greater than 50 percent sodium and is useful in the invention.

The surfactant used in the practice of the invention is not narrowly critical. Surfactants which work very well are those useful in the car and truck washing industry. These surfactants are commercially available and include one or more of such active ingredients as sodium metasilicate, sodium sulfate, sodium tripolyphosphate, sodium dodecylbenzene sulfonate, and trisodium phosphate.

In the practice of the invention, the modular system component 10 shown in FIGS. 1 to 3 preferably forms part of a water treatment system which comprises a plurality, for example three, such modular components which are readily removably connected into a suitable piping system, such as the piping system 66 to be described hereinafter, which may be part of a stationary installation (not shown). However, the modular components and said piping system may alternatively, and very advantageously, be part of a mobile installation which can be readily moved from the one location to another.

FIG. 4 diagrammatically illustrates a mobile installation in which a water treatment system embodying the invention is mounted on a wheeled support such as a trailer 62. Three of the modular system components 63, 64 and 65, which may be identical with the component 10 shown in FIGS. 1 to 3, are readily releasably connected in serial fashion into a piping system 66 carried by the trailer 62.

The piping system 66 is provided with power driven pump means which can take a number of forms, each of which is effective to pump water to be treated serially through the modular components 63, 64 and 65. In one arrangement the piping system may include a pump at the outlet of each modular component, such as the pump 67 shown in FIG. 2, and may also include a related shut off valve 68. Alternatively, the piping system may instead include one or more pumps located externally of the serially connected modular components, such as the pumps 69 and 73 shown in FIG. 4.

The piping system 66 shown in FIG. 4 connects the inlet of the component 63 with the outlet of pump 73, the inlet of said pump being connected to a source of waste water, such as a holding tank 70 or other source of a feed stream of water to be treated in the installation to remove therefrom unwanted substances. Such substances usually include at least one of the many and varied constituents which are subject to industrial effluent limitations under applicable environmental laws. A typical feed stream is the effluent from a car or truck washing installation.

The pump 73 has the primary function of propelling a feed stream from the tank 70 to the inlet of the component 63, whereas the principal function of the pump 69 is to pump effluent from the outlet of component 65 to a holding tank 71 or other receptacle suitable for receipt of treated water, or to an on-site piping system (not shown) for receipt of the water treated in the installation. In another arrangement only one of the pumps 69 and 73 may be used to pump the feed stream through the system.

The mobile type of system advantageously may also comprise an internal combustion engine driven electric power generator (not shown) also mounted on the trailer 62, for powering the pump or pumps in the piping system 66 and any other electrically powered equipment carried by trailer 62.

In a stationary installation, the piping system and holding tanks, if used, are permanently installed at selected on-site locations. As in the mobile installation, suitable readily releasable connections (not shown) are provided by which modular components such as the components 63, 64 and 65, can be quickly and easily connected into and removed from operating positions in the piping system 66 as needed or desired. In both the stationary and mobile types of installations, the pumps and piping system 66 cause the feed stream of waste water to flow successively from top to bottom through the respective modular system components from the inlet of component 63 to the outlet of component 65.

If the feed stream of waste water to be treated is known to contain no or very little surfactant, then prior to the securement of the cover 15 of each of the components 63 to 65 in operative position, a quantity of surfactant, for example up to about 4 ounces of dry powdered surfactant, is sprinkled over the top zeolite bed 51 therein. Care must be taken in order to avoid using a quantity of surfactant which would produce undesirable foaming within any modular component.

Prior to placing the water treatment apparatus of the invention into operation, each of the modular components is filled with fresh water to thereby thoroughly soak the contents thereof. After the soaking step, the fresh water is pumped from the components to ready the apparatus for operation.

The feed stream of waste water or the like to be treated in the apparatus is then introduced, preferably in diluted form, into the inlet of the first modular component in the series, i.e., the component 63 shown in FIG. 4. Referring to FIGS. 1 to 3, the waste water enters the top of the first component in the series through fitting 33 and spray head 32 which distributes said water over the upper surface of the glass fiber prefilter 48 shown in FIG. 2. Prefilter 48 traps any solid particles in the feed stream as it passes therethrough. The waste water then flows down onto the zeolite bed 51, flowing therethrough, as well as through the cellulose bed 50 and through the cellulose pad 49.

The feed stream then flows downwardly through the perforated bottom wall 28 of compartment 11 and onto and through the zeolite bed 56, cellulose bed 54 and cellulose pad 52 located in compartment 12. As the feed stream flows out of the compartment 12 through the perforations in the bottom wall 29 thereof, it flows downwardly onto and through the zeolite bed 57, cellulose bed 55 and cellulose pad 53 located in compartment 13, flowing out of said compartment through the perforated bottom wall 30 thereof.

The feed stream continues its downward flow through the zeolite bed 61, cellulose bed 60, activated carbon bed 59 and cellulose pad 58 in compartment 14, and leaves said compartment through the perforated bottom wall 31 thereof. As the feed stream enters the base compartment 16, it drops onto the sloping drain pan 46 therein and is directed thereby toward the outlet 34.

The effluent stream leaving the outlet 34 of modular component 63, is propelled by the pump or pumps through the piping system 66 to the inlet 33 of modular component 64, becoming the influent stream for said component. This influent stream flows downwardly through the component 64 and through the prefilter, zeolite beds, cellulose beds, activated carbon bed and cellulose pads therein just as the feed stream did through the modular component 63. Upon reaching the outlet 34 of the component 64, the effluent stream is propelled by the pump or pumps through the piping system 66 to the inlet 33 of the modular component 65, where it becomes the influent stream for said component.

This influent stream flows downwardly through the modular component 65 as it did through the components 63 and 64, flowing through the prefilter, zeolite beds, cellulose beds, activated carbon bed and cellulose pads therein. Upon reaching the outlet 34 of modular component 65 it becomes an effluent stream therefrom which is propelled by the pump or pumps through the piping system 66 to a holding tank 71 or other receptacle, or to a suitable on-site piping system (not shown) for receipt thereof.

As the waste water flows through the modular components 63, 64 and 65, surprising results are produced for reasons which are not completely understood. It appears that during transit through the modular components the water therein becomes involved in a complex process. This process is believed to involve chemical reaction, physical filtering and containment, adsorption and ion capture or exchange.

Petroleum hydrocarbons in the feed steam are mechanically filtered in the cellulose beds and pads and also appear to be altered chemically by the presence of the surfactant in the feed stream. It has been suggested that when a surfactant reacts with a neutral organic molecule, two actions can be considered to take place. Initially, there is a partial solvation of the organic molecule into the surfactant, and once this occurs, the resultant species contains an ionic functional group. When the ionized species passes into contact with the zeolite mineral, either ion-exchange or ion-capture processes occur, and the organic molecule is removed from the water stream. Any organic molecules which do not react with the surfactant are selectively filtered by the hydrophobic cellulose, and any particulate matter which is inert to the surfactant is physically trapped in said cellulose.

If soluble heavy metal ions or other organic species are present in the waste water, chemical reactions can occur between these and the surfactants as well. This interaction renders the subsequent species more susceptible to the ion exchange/ion capture processes within the zeolite. In addition, the subsequent inorganic ion/surfactant complex is more readily adsorbed by the hydrophobic cellulose.

Although specific chemical reactions occurring in the modular components 63, 64 and 65 have not been identified because of the extremely complex nature of waste water, it is probable that several reactions take place. These could include single displacement, double displacement, hydration and ion exchange. Depending upon the solubility of the resultant products, they may be filtered or reacted further with the zeolite mineral and surfactant in additional modular system components of the type described herein.

In the development of the invention, numerous prototypes were tested which demonstrated the surprising results which are achieved by the invention. The following tables set forth certain analytical specifics regarding both the feed streams treated in a particular apparatus and the after treatment effluent produced thereby.

All such analyses were carried out by a reputable laboratory specializing in analytical and environmental services. The laboratory was given no information about the treatment method which was productive of the effluent samples as the feed streams were flowed through the apparatus. The tables also provide the identifying numbers of the particular EPA or other tests which were carried out to produce the respective analytical data in the tables.

Table 1 illustrates the results of passing a feed stream of waste water through a 32 gallon plastic drum (not shown) having an upper inlet and a lower outlet. A perforated enclosure (not shown) in the bottom of the drum accommodated therein a power driven pump connected to the drum outlet for pumping effluent therethrough. A polyurethane plastic bag (not shown) lined the drum and had a perforated bottom wall which rested on the top of the pump enclosure.

Disposed within the drum and liner were four vertically spaced beds of heulandite zeolite pebbles (not shown) which were similar to the beds 51, 56, 57, and 61 in FIG. 2, each of said beds being enclosed within a plastic mesh bag (not shown). A bed (not shown) of hydrophilic cellulose pellets, enclosed within a nylon mesh bag and disposed within the bottom of the drum liner bag, rested on the top of the pump enclosure and had the lowermost bed of zeolite pebbles superimposed thereon. The bed of hydrophilic cellulose was similar to the beds 50, 54, 55 and 60 in FIG. 2, except for the hydrophilic, rather than hydrophobic, character of the cellulose therein.

Interposed between the lowermost zeolite bed and the zeolite bed next above it was a bed of hydrophobic cellulose pellets similar to the beds 50, 54, 55 and 60 in FIG. 2. Interposed between the last mentioned zeolite bed and the third zeolite bed from the bottom was another bed of hydrophobic cellulose pellets like the first mentioned bed of hydrophobic pellets. Interposed between the third zeolite bed from the bottom and the topmost zeolite bed was another bed of hydrophilic cellulose pellets similar to the first mentioned bed of hydrophilic cellulose.

Between each of the adjacent beds of zeolite pebbles and cellulose pellets was interposed a circular multilayer laminated pad of hydrophobic cellulose fibers similar to the pads 49, 52, 53 and 58 in FIG. 2. The same type of pad overlaid the topmost bed of zeolite pebbles and also underlaid the bottommost bed of hydrophilic cellulose pellets. Each of the beds of zeolite pebbles and cellulose pellets was enclosed within a plastic mesh bag of the type enclosing the beds in FIG. 2 and each of said beds extended radially into snug contact with the drum liner around its periphery. The cellulose pads similarly extended into snug contact with the drum liner around their peripheries. The zeolite beds contained about 2 pounds of zeolite each, and the cellulose beds contained about 10 pounds of cellulose each.

The principal constituents of the feed stream passed through the drum just described were those which would be expected to be present in the waste water resulting from washing of truck bodies, engines and chassis, i.e., oil and grease and diesel fuel. This waste water also contained some of the surfactant used in the car or truck washing solution to effect removal of the aforementioned constituents.

Table 1 indicates that the influent feed stream passed through the described drum and into contact with the zeolite in the presence of the surfactant therein had a Total Oil and Grease content of 3,920 milligrams per liter (mg/1), which was reduced to 7 mg/l in the effluent, said reduction being equal to 99.8 percent, i.e., substantially 100 percent, of the oil and grease in the feed stream. Concomitantly the Total Petroleum Hydrocarbons-Diesel which was present in the influent feed stream in the amount of 56.6 mg/l was reduced to less than 0.5 mg/l in the effluent, said reduction being equal to more than 99.1 percent, i.e., substantially 100 percent, of the total petroleum hydrocarbons-diesel in the feed stream. Anything approaching these results is unheard of in the art of waste water treatment, particularly with respect to the diesel fuel removal.

TABLE 1

| Constituent | Analysis of WW Before Treatment | Analysis of After Treatment Effluent | Units | Method |
|---|---|---|---|---|
| Oil & Grease, Total | 3920 | 7. | mg/l | EPA 413.1 |
| Total Petroleum Hydrocarbons-Diesel | 56.6 | <0.5 | mg/l | EPA 8015M |

Table 2 illustrates the results produced by passing a waste water feed stream from a car wash serially through three connected drums of the type used in the treatment of the feed stream which was productive of the Table 1 data. It will be observed that the feed and effluent streams in Table 2 were analyzed for total chromium, as well as for total oil and grease and total petroleum hydrocarbons-diesel.

The feed stream in Table 2 was more dilute than that in Table 1, and passage thereof through the three drums, into contact with the zeolite in the presence of the surfactant in the feed stream, was productive of an effluent content of 9 mg/l of total oil and grease, compared to a feed stream content of 71 mg/l, representing a reduction equal to 87.3 percent of the total oil and grease in the feed stream. The total petroleum hydrocarbons-diesel was present at the level of 94.5 mg/l in the feed stream but was present in the effluent at less than 1 mg/1, representing a reduction equal to more than 98.9 percent, i.e., substantially 100 percent, of the total hydrocarbons-diesel in the feed stream. The total chromium in the feed stream was 553 mg/1, whereas the total chromium content in the effluent was only 0.97 mg/1, representing a reduction equal to 99.8 percent, i.e., substantially 100 percent, of the chromium in the feed stream.

The results in Table 2 conform generally to those in Table 1, as far as oil and grease and total hydrocarbon-diesel are concerned, but the total chromium results show the completely unexpected effectiveness of the invention with respect to removal of substantially all of the chromium from waste water simultaneously with removal therefrom of the oil and grease and diesel fuel. Such removal of a heavy metal from waste water is unheard of in the waste water treatment art.

As an interesting sidelight to the testing reported in Table 2, effluent water produced in this run was transferred to a fish tank as the only liquid therein, and four goldfish were placed in that water. The goldfish lived between eight and fifteen weeks.

TABLE 2

| Constituent | Analysis of WW Before Treatment | Analysis of After Treatment Effluent | Units | Method |
|---|---|---|---|---|
| Oil & Grease, Total | 71 | 9 | mg/l | EPA 413.1 |
| Total Petroleum Hydrocarbons-Diesel | 94.5 | <1 | mg/l | EPA 8015M |
| Chromium, Total | 553 | 0.97 | mg/l | EPA 218.1 |

Utilizing the same type of set up as that which was productive of the data in Table 2, a feed stream was prepared by mixing with about 30 gallons of waste water containing oil and grease, about 8 ounces of dry surfactant composition of the type used in car washing solutions, a portion of strontium as strontium chloride, a portion of lead as lead nitrate, a portion of chromium as chromic acid and a portion of ethylene glycol. This feed stream was tested for the amounts of oil and grease, the added metals and ethylene glycol and was passed serially through the drums of the type which were productive of the data in Table 2.

The effluent produced was tested for the presence of the same constituents as the feed stream was, and as shown in Table 3, the oil and grease content of the waste water feed stream was 555 mg/1, whereas the content thereof in the effluent was 7 mg/1, representing a reduction equal to 98.7 percent, i.e., substantially 100 percent, of the total oil and grease in the feed stream. The strontium content of the feed stream was 311 mg/1, whereas the content thereof in the effluent was 0.85 mg/1, representing a reduction equal to 99.7 percent, i.e., substantially 100 percent, of the strontium in the feed stream. The lead content of the feed stream was 26.4 mg/1, whereas the lead content of the effluent was 0.95 mg/1, representing a reduction equal to 96.4 percent of the lead in the feed stream. The chromium content of the feed stream was 67.3 mg/1, whereas the content thereof in the effluent was 0.63 mg/1, representing a reduction equal to 99 percent, i.e., substantially 100 percent, of the chromium in the feed stream. The ethylene glycol in the feed stream was present at less than the minimum detectable limit (MDL) of the test used (i.e., less than 2.5 mg/1).

TABLE 3

| Constituent | Analysis of Waste Water Before Treatment | Analysis of After Treatment Effluent | Units | Method |
|---|---|---|---|---|
| Oil & Grease, Total | 555 | 7. | mg/l | EPA 413.1 |
| Strontium Calculated as SrCl$_2$ | 311 | 0.85 | mg/l | EPA 200.7 |
| Lead calculated as PbNO$_3$ | 26.4 | .95 | mg/l | EPA 239.1 |
| Chromium Total | 67.3 | .63 | mg/l | EPA 218.1 |
| Ethylene Glycol | <2.5 | <2.5 | mg/l | EPA 8240 |

In view of the fact that in the nuclear energy field isotopes of strontium are made dangerously radioactive, the ability of the invention to remove substantially all of the strontium from waste water may contribute to the development of safe disposal procedures for radioactive waste.

Utilizing the same type of set up as was productive of the data in Tables 2 and 3, except that the zeolite used was changed to a clinoptilolite, and about 4 ounces of surfactant of the type generally used in car washing solutions was added to each drum, a feed stream of ocean water was passed serially through the drums. The feed stream, as well as the effluent, was tested for sodium, chloride, pH, and hardness (as CaCo$_3$).

As shown in Table 4, the feed stream sodium content was 8,950 mg/l, whereas the effluent content thereof was 130 mg/l, representing a reduction equal to 98.5 percent, i.e., substantially 100 percent, of the sodium in the feed stream. The feed stream chloride content as 20,100 mg/l, whereas the effluent content thereof was 3,100 mg/l, representing a reduction equal to 84.6 percent of the chloride in the feed stream. The pH of the feed stream was 8.1, whereas the pH of the effluent was 8.0. The feed stream hardness was 6,040 mg/l of CaCO$_3$, whereas the effluent hardenss was 312 mg/l of CaCo$_3$, representing a reduction equal to 94.8 percent of the CaCo$_3$ in the feed stream.

This data clearly shows the remarkable effectiveness of the invention for the desalinization of sea water. As noted above, the disparity between the sodium content of the feed stream and that of the effluent represents a reduction equal to 98.5 percent of the sodium in the feed stream. This is also unheard of in the water treatment art, and it is accomplished in inexpensive apparatus, in contrast to the expensive desalination process equipment currently in use.

TABLE 4

| Constituent | Analysis of Ocean Water Before Treatment | Analysis of After Treatment Effluent | Units | Method |
|---|---|---|---|---|
| Sodium | 8,950. | 130. | mg/l | EPA 273.1 |
| Chloride | 20,100. | 3,100. | mg/l | EPA 300. |
| pH | 8.1 | 8. | mg/l | EPA 150.1 |
| Hardness as CaCO$_3$ | 6,040. | 312. | mg/l | SM2340 C |

For use in the same type of set up as in the previous run, a feed stream of sludge was taken from a settling tank of a truck service station. This sludge was diluted with an equal amount of fresh tap water and the diluted feed stream was analyzed to the extent possible. However, because of the nature of the feed stream, testing for certain constituents was not possible. The before treatment sample was a two phase liquid containing a large percentage of oil., and the analysis was performed on a representative portion of each phase to determine the concentration of the entire sample to the extent possible.

The diluted feed stream was passed serially through the drums, and the effluent was tested for the same constituents as the feed stream, as well as for others for which testing of the feed stream was impossible. The results of this testing are set forth on Table 5 and are particularly notable because of the showing that the invention can simultaneously remove additional metals from waste water, and the consistency in the disparity between the values of the constituents in the feed stream and those of the same constituents in the effluent shown in parentheses below. This disparity is particularly pronounced with respect to the light weight metal barium (8.34/0.04), representing a reduction equal to 99.5 percent, i.e., substantially all, of the barium in the feed stream and the light weight metal boron (1.46/<0.05) representing a reduction equal to more than 65.75% of the boron in feed stream. With respect to the heavy metals (defined as those having a specific gravity of 5.0 or above) the feed stream and effluent values in parentheses, together with the percentage reduction produced, in terms of a percentage of the amount of the respective metal in the feed stream, are as follows: cadium (0.02/0.0011) a reduction of 94.5 percent, chromium (0.51/<0.05) a reduction of more than 90.2 percent copper (19.1/0.08) a reduction of 99.6 percent, i.e., a reduction of substantially 100 percent, iron (184/0.42) a reduction of 99.8 percent, i.e., a reduction of substantially 100 percent manganese (5.02/0.2) a reduction of 96 percent zinc (16.7/0.76) a reduction of 95.4 percent. Table 5 also evidences the fact that with respect to hazardous solvents such as phenolics (0.349/<0.05) the disparity between feed stream and effluent content produced by the invention represents a reduction equal to more than 85.7 percent of the phenolic content of the feed stream. Also notable is the disparity evident with respect to influent and effluent biochemical oxygen demand (41,200/162) a reduction of 99.6 percent, i.e., a reduction of substantially 100 percent and total petroleum hydrocarbon-diesel (147,000/<0.5), a reduction of 99.999 percent, i.e., a reduction of substantially 100 percent, all of which finds no precedent in the prior art.

TABLE 5

| Constituent | Analysis of Waste Water Before Treatment | Analysis of After Treatment Effluent | Units | Method |
|---|---|---|---|---|
| pH | 6.9 | 7.60 | Units | EPA 9045 |
| Arsenic | <0.02 | <0.02 | mg/l | EPA 206.3 |
| Barium | 8.34 | 0.04 | mg/l | EPA 200.7 |
| Cadmium | 0.02 | 0.0011 | mg/l | EPA 200.7 |
| Chromium, Total | 0.51 | <0.05 | mg/l | EPA 200.7 |
| Cobalt | <0.1 | <0.1 | mg/l | EPA 200.7 |
| Copper | 19.1 | 0.08 | mg/l | EPA 200.7 |
| Cyanide, Total | <0.30 | <0.05 | mg/l | EPA 9010 |
| Iron | 184. | 0.42 | mg/l | EPA 200.7 |
| Lead | 1.72 | 0.1 | mg/l | EPA 239.1 |
| Manganese | 5.02 | 0.2 | mg/l | EPA 200.7 |
| Mercury | <0.001 | <0.001 | mg/l | EPA 245.1 |
| Nickel | 0.34 | <0.01 | mg/l | EPA 200.7 |
| Selenium | <0.01 | <0.01 | mg/l | EPA 270.3 |
| Silver | <0.05 | <0.05 | mg/l | EPA 200.7 |
| Zinc | 16.7 | 0.76 | mg/l | EPA 200.7 |
| Phenolics | 0.349 | <0.05 | mg/kg | EPA 420.1 |
| Biochemical | 41,200. | 162. | mg/l | EPA 405.1 |

TABLE 5-continued

| Constituent | Analysis of Waste Water Before Treatment | Analysis of After Treatment Effluent | Units | Method |
|---|---|---|---|---|
| Oxygen Demand | | | | |
| Sodium | 142. | 125. | mg/l | EPA 200.7 |
| Boron | 1.46 | <0.5 | mg/l | EPA 200.7 |
| Total Petroleum Hydrocarbon-Diesel | 147,000. | <0.5 | mg/kg | EPA 8015M |
| Total Suspended Solids | | 27. | mg/l | EPA 160.2 |
| Surfactant (MBAS) LAS Mol. Wt. 342 | | 38. | mg/l | EPA 425.1 |
| Dissolved Sulfide | | <0.10 | mg/l | SM4500S2-D |
| Oil & Grease Total | | 10. | mg/l | EPA 413.1 |
| Color | | 20. | Units | EPA 110.2 |
| Chloride | | 74.6 | mg/l | EPA 300 |
| Sulfate | | 234. | mg/l | EPA 300 |
| Hardness as $CaCO_3$ | | 257. | mg/l | SM2340 C |
| Fluoride | | 0.13 | mg/l | EPA 340.2 |
| Total Dissolved Solids | | 653. | mg/l | EPA 160.1 |

For the next run, the same type of set up as that which was productive of the data in Table 5 was used, except that all of the cellulose pads and beds used therein were of hydrophobic cellulose. No hydrophilic cellulose was used, because it was found that, due to its water absorptivity, it tended to disintegrate too rapidly. The waste water feed stream was taken from a settling tank at the same truck center as that from which the feed stream for Table 5 was taken. The waste water sample was not as thick as the previous one, and it was diluted with an equal amount of fresh water to facilitate analysis for all of the constituents noted in Table 6.

The waste water feed stream was then run serially through the drums and the effluent therefrom was analyzed for the same constituents as the feed stream. Table 6 provides comparative analyses of the feed stream and effluent. Notable disparities between the levels of constituents of the feed and effluent streams can be found in Table 6 with respect to the metals barium (6.34/0.05), a reduction of 99.2 percent, cadium (0.09/0.015) a reduction of 83.3 percent, iron (177/0.56) a reduction of 99.68 percent, i.e., a reduction of substantially 100 percent, lead (0.95/<0.1) a reduction of more than 89.5 percent, zinc (4.92/0.86) a reduction of 82.5 percent, maganese (7.24/0.1) a reduction of 98.6 percent, copper (1.83/<0.05) a reduction of more than 97.3 percent, chromium (0.45/<0.05) a reduction of more than 89.5 percent, and nickel (0.18/0.012) a reduction of 93.3 percent.

Also notable are biochemical oxygen demand (228/81) a reduction of 64.5 percent, total suspended solids (16,300/15.1) a reduction of 99.91 percent, i.e., a reduction of substantially 100 percent, oil and grease (98/17) a reduction of 82.7 percent, sodium (106/63.5) a reduction of 40.1 percent, total petroleum hydrocarbons-Diesel (292/1) a reduction of 99.66 percent, i.e., a reduction of substantially 100 percent, and disolved sulfide (6/<0.1) a reduction of more than 98.3 percent. Since certain sulfide compounds are known to be malodorous, a significant reduction in dissolved sulfides may remove a potential source of air polutions from waste water.

TABLE 6

| Constituent | Analysis of Waste Water Before Treatment | Analysis of After Treatment Effluent | Units | Method |
|---|---|---|---|---|
| pH | 8.3 | 7.2 | Units | EPA 150.1 |
| Arsenic | 0.03 | <0.01 | mg/l | EPA 206.3 |
| Barium | 6.34 | 0.05 | mg/l | EPA 200.7 |
| Cadmium | 0.09 | 0.015 | mg/l | EPA 213.2 |
| Chromium, Total | 0.45 | <0.05 | mg/l | EPA 200.7 |
| Cobalt | <0.1 | <0.1 | mg/l | EPA 200.7 |
| Copper | 1.83 | <0.05 | mg/l | EPA 200.7 |
| Cyanide, Total | <0.05 | <0.05 | mg/l | EPA 335.2 |
| Iron | 177. | 0.56 | mg/l | EPA 200.7 |
| Lead | 0.95 | <0.1 | mg/l | EPA 239.1 |
| Manganese | 7.24 | 0.1 | mg/l | EPA 200.7 |
| Mercury | <0.001 | <0.001 | mg/l | EPA 245.1 |
| Nickel | 0.18 | 0.012 | mg/l | EPA 249.2 |
| Selenium | <0.01 | <0.01 | mg/l | EPA 270.3 |
| Silver | <0.03 | <0.03 | mg/l | EPA 272.1 |
| Zinc | 4.92 | 0.86 | mg/l | EPA 289.1 |
| Phenolics | 0.11 | <0.05 | mg/l | EPA 420.1 |
| Biochemical Oxygen Demand | 228. | 81. | mg/l | EPA 405.1 |
| Total Suspended Solids | 16,300. | 15. | mg/l | EPA 160.2 |
| Surfactant (MBAS) LAS Mol. Wt. 342 | 26.5 | 17.5 | mg/l | EPA 425.1 |
| Dissolved Sulfide | 6. | <0.1 | mg/l | SM4-500S2-D |
| Oil & Grease Total | 98. | 17. | mg/l | EPA 413.1 |
| Color | dark black | 50. | Units | Before visual exam After EPA 110.2 |
| Sodium | 106. | 63.5 | mg/l | EPA 200.7 |
| Chloride | 33. | 42. | mg/l | SM4500-C1-B |
| Sulfate | 29.8 | 245. | mg/l | EPA 375.4 |
| Hardness as $CaCO_3$ | 177. | 257. | mg/l | SM2340 C |
| Fluoride | 1.38 | 0.26 | mg/l | EPA 340.2 |
| Boron | 1.91 | 1.84 | mg/l | EPA 200.7 |
| Total Dissolved Solids | 502. | 431. | mg/l | EPA 160.7 |
| Total Petroleum Hydrocarbons-Diesel | 292. | 1. | mg/l | EPA 8015M |

Figure 5:
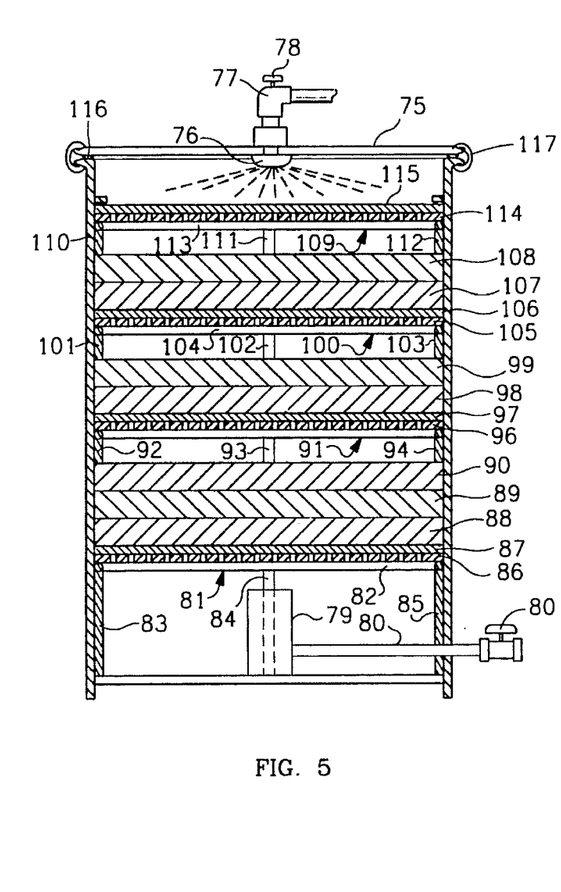
FIG. 5 illustrates in vertical section another form of modular system component of the present invention.

FIG. 5 illustrates another embodiment of the apparatus of the present invention which, like the embodiments which were discussed earlier herein with respect to the runs productive of tables 1 to 6, does not involve a compartmented tank. FIG. 5 discloses a drum 74, which may be a 55 gallon drum having a cover 75. The cover 75 and drum 74 are adapted to sealingly interfit by virtue of a sealing gasket 116 and a tension band 117 whose function is similar to the tension band 41 in FIG. 3.

The cover 75 is fitted with an internal spray head 76 having an external connection fitting 77 provided with a manual shut off valve 78. The drum 74 is provided with a power driven pump 79 in the bottom thereof having an outlet pipe 80 which sealingly projects through the drum wall to an external connection which may take the form of a shut off valve 80.

Disposed in the bottom of drum 74 also is a table-like structure 81 which comprises a horizontally extending annular ring top portion 82 having four vertically depending legs, three of which appear in FIG. 5 and are numbered 83, 84 and 85. Supported on the annular ring 82 is a circular perforated plate 86 of any suitable material such as plastic or metal. Overlaying the plate 86 is a circular multilayer laminated pad 87 of hydrophobic cellulose fibers. A cylindrical bed 88 of activated carbon beads retained within a plastic mesh bag (not shown) is superimposed on the pad 87, and superimposed on the bed 88 is a cylindrical bed 89 of hydrophobic cellulose pellets also retained within a plastic mesh bag (not shown). A cylindrical bed 90 of zeolite pebbles retained within a plastic mesh bag (not shown) is superimposed on the bed 89.

Disposed within the drum 74 and resting on the zeolite bed 90 is a second table-like structure 91 of the same construction as the structure 81, except that the legs thereof, legs 92, 93 and 94 being shown, are shorter than the legs of structure 81. The annular ring top portion 95 of structure 91 supports a horizontal perforated plate 96 which may be the same as the plate 86. A circular cellulose pad 97, cylindrical bed 98 of cellulose pellets and cylindrical bed 99 of zeolite pebbles, which may be the same as pad 87, bed 89 and bed 90, respectively, are disposed on the plate 96 as shown.

Supported on the zeolite bed 99 is a table-like structure 100 which may be the same as the table-like structure 91, the legs 101, 102 and 103 being shown depending from an annular ring top portion 104. The annular ring 104 supports a circular perforated plate 105, and the latter is overlaid with a circular cellulose pad 106 which is like pads 87 and 97. Superimposed on pad 106 is a cellulose bed 107 which is like beds 89 and 98, and superimposed on bed 107 is a cylindrical bed of zeolite 108 which is like beds 90 and 99.

Supported on the zeolite bed 108 is a table-like structure which is the same as the structures 91 and 100, legs 110, 111 and 112 of which are shown depending from a horizontal annular ring top portion 113. A circular perforated plate 114, which is the same as plates 86, 96 and 105, is supported on the annular ring portion 113, and a circular filter 115 formed of glass fiber overlays the plate 114.

A second drum (not shown) and its contents were then assembled as duplicates of the drum assembly shown in FIG. 5. The inlet fitting 77 of drum 74 was connected to a source (not shown) of a feed stream of waste water, which in the instant case was a thirty five gallon mixing tank. The outlet fitting 80 of drum 74 was connected to the inlet fitting of the second drum.

A feed stream source was prepared in the mixing tank by placing therein 2.5 gallons of sea water, 8 ounces of diesel fuel, 8 ounces of ethylene glycol, 8 ounces of engine oil which had been used and was dirty, and 4 ounces of surfactant of the type used in car washing solutions. The 32 gallon mixing drum was then filled with fresh water up to the 30 gallon level. The drum 74 and its counterpart (not shown) connected in series therewith, were prefilled with fresh water and allowed to soak, after which the fresh water was pumped therefrom.

Prior to opening the valve 78 to permit the feed stream to flow into drum 74, the contents of the mixing tank were thoroughly stirred and a sample was taken for analysis. The valve 78 and the corresponding valve on the second drum were then opened, and the pump on drum 74 was activated to cause the feed stream to flow from the mixing tank into drum 74 and through all of the zeolite, cellulose and activated carbon beds therein, as well as through the cellulose pads therein. The pump in the second tank was activated to cause the effluent from drum 74 to flow through the second drum, as the feed stream fed to drum 74 flowed through the latter.

The effluent from the second drum was sampled and analyzed for the constituents used in the preparation of the feed stream in the mixing tank. The analytical results with respect to the feed stream and after treatment effluent are shown in Table 7.

The data in Table 7 shows that the form of the invention shown in FIG. 5 also performs in a manner unheard of in the prior art by reducing the total oil and grease from 17,800 mg/l down to 3 mg/l a reduction of 99.98 percent, i.e., a reduction of substantially 100 percent. It also reduces the total hydrocarbon-diesel from 58 mg/l to 0.53 mg/l a reduction of 99.09 percent, i.e., a reduction of substantially 100 percent. Significant reductions are also noted with respect to sodium (939/548) a reduction of 41.6 percent and chloride (1860/773) a reduction of 58.4 percent.

TABLE 7

| Constituent | Analysis of Waste Water Before Treatment | Analysis of After Treatment Effluent 1 | Units | Method |
|---|---|---|---|---|
| Oil & Grease, Total | 17,800 | 3 | mg/l | EPA 413.1 |
| Total Petroleum Hydrocarbons-Diesel | 58 | 0.53 | mg/l | EPA 8015M |
| Ethylene glycol Note: Interferences present | <5,000 | <500 | mg/l | EPA 8015M |
| Chloride | 1,860 | 773 | mg/l | SMA500-Cl B |
| Sodium | 939 | 548 | mg/l | EPA 200.7 |
| pH | 7.3 | 6.9 | Units | EPA 150.1 |
| Hardness as CaCo$_3$ | 756 | 429 | mg/l | SM2340 C |

As has been demonstrated by the discussion of the data in tables 1 to 7 herein, the invention is capable of producing up to substantially 100 percent reductions in a wide variety of unwanted substances in waste water, sea water, or soil, such substances including petroleum hydrocarbons, such as oil and grease and diesel fuel, salt, barium, boron, calcium, sodium and strontium, heavy metals, hazardous solvents (phenolics), ethylene glycol and dissolved sulfides. In addition, substantial reductions in biochemical oxygen demand can be effected. Also in contrast to certain other water treatment methods, the invention acts simultaneously on all of the unwanted substances susceptible thereto, rather than on one at a time. Moreover, the invention does not require expensive apparatus to perform its function.

What is claimed is:

1. A method of treating motor vehicle washing waste water containing at least one of an oil and grease constituent and a nonsurfactant petroleum hydrocarbon-diesel constituent, said method being capable of removing from said waste water substantially 100 percent of at least one of said constituents, said method comprising the step of bringing said waste water into direct contact with the surfaces of a quantity of pebbles of natural zeolite exposed within a tank for said contact, said contact taking place in the presence of a surfactant, wherein said waste water further contains one or more of heavy metals, phenolics, dissolved sulfides, ethylene glycol, barium, strontium, boron, calcium, and sodium, at least one of which is also removed by said step.

2. The method of claim 1 wherein said zeolite and said surfactant have a dominant sodium cation.

3. The method of claim 1 wherein said zeolite is clinoptilolite, heulandite, chabazite, phillipsite or alancime.

4. The method of claim 1 wherein said surfactant is at least in part present in said waste water before treatment thereof.

5. The method of claim 1 wherein said constituent capable of being substantially completely removed from said waste water is oil and grease.

6. The method of claim 5 wherein said surfactant is at least in part present in said waste water before treatment thereof.

7. The method of claim 1 wherein said constituent capable of being substantially completely removed from said waste water is petroleum hydrocarbon-diesel.

8. The method of claim 7 wherein said surfactant is at least in part present in said waste water before treatment thereof.

9. The method of claim 1 wherein said oil and grease constituent and said nonsurfactant petroleum hydrocarbon-diesel constituent are both present in said waste water, and substantially 100 percent of both said constituents is removed from said waste water simultaneously by said step.

10. The method of claim 9 wherein said surfactant is at least in part present in said waste water.

11. The method of claim 1 wherein said quantity of pebbles of natural zeolite is in the form of at least one liquid permeable bed accommodated within an apertured enclosure permitting fluid flow therethrough.

12. The method of claim 11 wherein, following contact with said zeolite pebbles, said waste water is caused to flow through at least one liquid permeable bed of hydrophobic cellulose pellets or a liquid permeable pad of hydrophobic cellulose, said pellets being accommodated within an apertured enclosure permitting fluid flow therethrough.

13. The method of claim 12 wherein, prior to contact with said zeolite pebbles, said waste water is passed through a glass fiber prefilter pad.

14. The method of claim 12, wherein, following contact with said zeolite pebbles, said waste water is passed through at least one water permeable bed of activated charcoal beads accommodated within an apertured enclosure permitting fluid flow therethrough.

15. The method of claim 14 wherein said zeolite pebbles are of the order of 1/3 inch across, said hydrophobic cellulose pellets are of the order of 1/4 inch across, said activated charcoal beads are of the order of 1/8 inch across, and the apertures of the enclosures for said pebbles, pellets and beads are of the order of 1/32 inch across.

16. The method of claim 1 wherein the waste water is pumped through at least one tank and through a plurality of spaced apart liquid permeable beds of said zeolite pebbles in said at least one tank.

17. The method of claim 16 wherein said waste water is pumped serially through a plurality of spaced apart liquid permeable beds of hydrophobic cellulose pellets individually interposed between successive spaced apart beds of said zeolite pebbles.

18. The method of claim 16 wherein said waste water is pumped serially through a plurality of said tanks.

19. The method of claim 17 wherein said waste water is pumped serially through a plurality of said tanks.

* * * * *